US008347476B2

(12) United States Patent
Chu

(10) Patent No.: US 8,347,476 B2
(45) Date of Patent: Jan. 8, 2013

(54) CLAMPING DEVICE FOR DETACHING THE UNIVERSAL COUPLING OF A REMOTE CONTROLLED CAR SHOCK ABSORBER

(76) Inventor: Daimler Chu, Hsinchuang (TW)

( * ) Notice: Subject to any disclaimer, the term of this patent is extended or adjusted under 35 U.S.C. 154(b) by 648 days.

(21) Appl. No.: 12/553,996

(22) Filed: Sep. 4, 2009

(65) Prior Publication Data

US 2010/0313401 A1 Dec. 16, 2010

(30) Foreign Application Priority Data

Jun. 10, 2009 (TW) ............................... 98210332 U

(51) Int. Cl.
*B23Q 3/00* (2006.01)
*B25B 11/00* (2006.01)

(52) U.S. Cl. ................ 29/282; 269/43; 269/37; 29/240; 29/271

(58) Field of Classification Search .................... 269/37, 269/58, 60, 77, 87.1–87.3, 164–166, 287, 269/288, 171, 155, 154; 29/802, 700, 428, 29/270, 275
See application file for complete search history.

(56) References Cited

U.S. PATENT DOCUMENTS 1,269,262 A * 6/1918 Crawford ...................... 269/101
2,261,055 A * 10/1941 Dulaney .............................. 81/6
2,595,787 A * 5/1952 Heimann ...................... 24/16 R
2,916,812 A * 12/1959 Milo .............................. 29/237
3,218,058 A * 11/1965 Smith .......................... 269/166
4,531,559 A * 7/1985 Glasgo ........................... 144/85
4,785,517 A * 11/1988 Takano .......................... 29/235
5,697,601 A * 12/1997 Gurule ........................... 269/43
5,860,197 A * 1/1999 Fox ................................ 24/522
6,206,355 B1 * 3/2001 Lichtenberg ................. 269/156
7,003,827 B2 * 2/2006 DeMayo ............................ 5/600
8,083,198 B2 * 12/2011 Stabler ...................... 248/316.6
2008/0203644 A1 * 8/2008 DaSilva ....................... 269/309

* cited by examiner

*Primary Examiner* — Lee D Wilson
*Assistant Examiner* — Tyrone V Hall, Jr.
(74) *Attorney, Agent, or Firm* — Leong C. Lei

(57) ABSTRACT

A clamping device, for detaching a universal coupling of a remote controlled car shock absorber, comprises a horizontal roller, a holder, and a mobile element; wherein the horizontal roller is pivotally connected to the holder for rotation purpose; the mobile element is connected with the holder such that the mobile element can clamp and hold the axis of the shock absorber, and engage the universal coupling of the shock absorber into the engagement socket of the horizontal roller; by way of the rotation of the horizontal roller, the invention can allow the user to easily detach or assemble the universal coupling and adjust the coupling depth of the universal coupling via screwing without impairing the axis of the shock absorber during detaching, assembling or adjusting the universal coupling.

6 Claims, 7 Drawing Sheets

CLAMPING DEVICE FOR DETACHING THE UNIVERSAL COUPLING OF A REMOTE CONTROLLED CAR SHOCK ABSORBER

BACKGROUND OF THE INVENTION (a) Technical Field of the Invention

The present invention relates to a clamping device for detaching the universal coupling of a remote controlled car shock absorber, particularly to one applying to the shock absorber of a remote controlled car for conveniently detaching its universal coupling, as well as for adjusting the coupling depth of the axis of the shock absorber without impairing the surface of the axis, such that the operation can be more convenient and the axis can be well protected.

(b) Description of the Prior Art

Given the rapid development of technology, the effect of motors has been constantly improved, and the motive power of motors is consequently enhanced. While people always pursue extreme speed, their desire has spanned to remote controlled cars, and the number of remote controlled car players has constantly increased. To avoid impairing of the chassis of the remote controlled cars during jumping on the rugged road surface, a shock absorber is indispensable for each remote controlled car for absorbing the shock occurred from the tyres. Therefore, the spring in a shock absorber need be adjusted pending the lumpy degree of the road surface. Besides, a shock absorber would be impaired after a long-term use, there is a need for a tool that can allow the user to conveniently exchange the axis of the shock absorber and the universal coupling at the rear end of the shock absorber. When the universal coupling at the rear end of the shock absorber is out of running, people of common skill used to utilize a vise and some simply clamping devices to hold the axis of the shock absorber, rotate the universal coupling the shock absorber, and detach the universal coupling and the shock absorber by screwing. However, during rotation, the axis of the shock absorber would easily be impaired by the vise due to its being unable to efficiently clamp the axis; therefore the axis of the shock absorber is rubbed to impairment by the vise, thereby affecting the function of the shock absorber.

In view of the above, the inventor has researched for a clamping device for detaching the universal coupling of a remote controlled car shock absorber, which not only can efficiently hold the axis of the shock absorber, but also can protect the surface of the axis from being scrubbed and thereby keeping it smooth.

SUMMARY OF THE INVENTION

The primary purpose of the present invention is to provide a clamping device for detaching the universal coupling of a remote controlled car shock absorber, which can hold the axis of the shock absorber for the user to conveniently adjust, detach or assemble the universal coupling of the shock absorber.

Another object of the invention is to provide a clamping device for detaching the universal coupling of a remote controlled car shock absorber, which may avoid the axis of the shock absorber from being rubbed during adjusting, detaching or assembling the universal coupling of the shock absorber, thereby protecting the surface of the axis and keeping it smooth.

To accomplish the above objects, the invention comprises a horizontal roller, a holder and a mobile element. The horizontal roller is provided with an extrusion, the free end of which has an engagement socket for receiving the universal coupling. After the extrusion is placed into the hole of the holder for pivotal connection, the mobile element is connected with the holder via a slide bar. The mobile element is provided with an upper base, a lower base and an evaluating roller. When the axis of the shock absorber is held between the upper base and the lower base, the universal coupling is placed into the engagement socket of the horizontal roller. After rotating the horizontal roller, the universal coupling can be loosened to detach from the axis of the shock absorber or fastened to assemble to the axis for adjustment purpose. It is convenient for the user's operation. Integrally speaking, the universal coupling can be rotated independently without impairing the axis of the shock absorber when the horizontal roller drives the universal coupling for rotation purpose.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
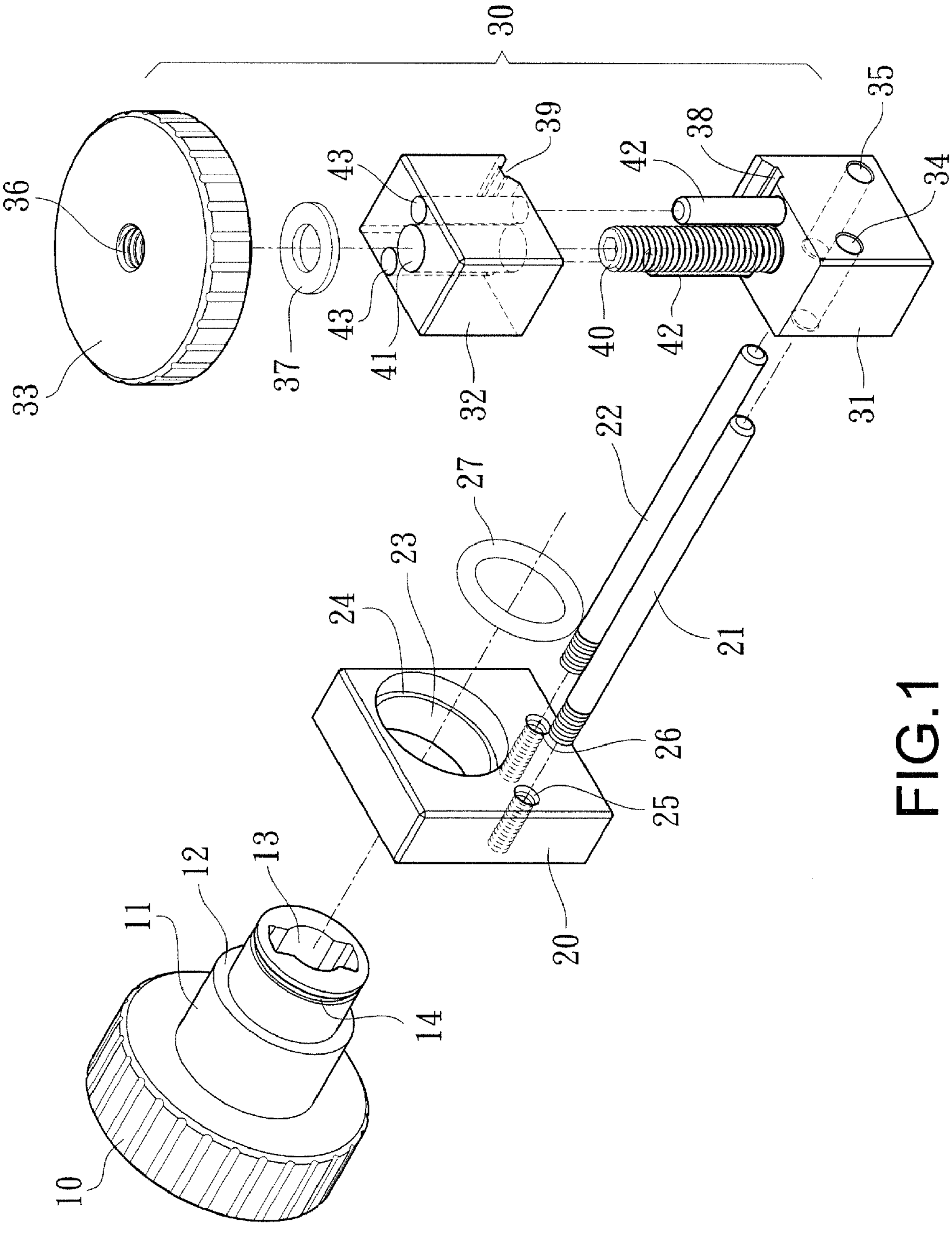
FIG. 1 is an exploded view of the present invention.
Figure 2:
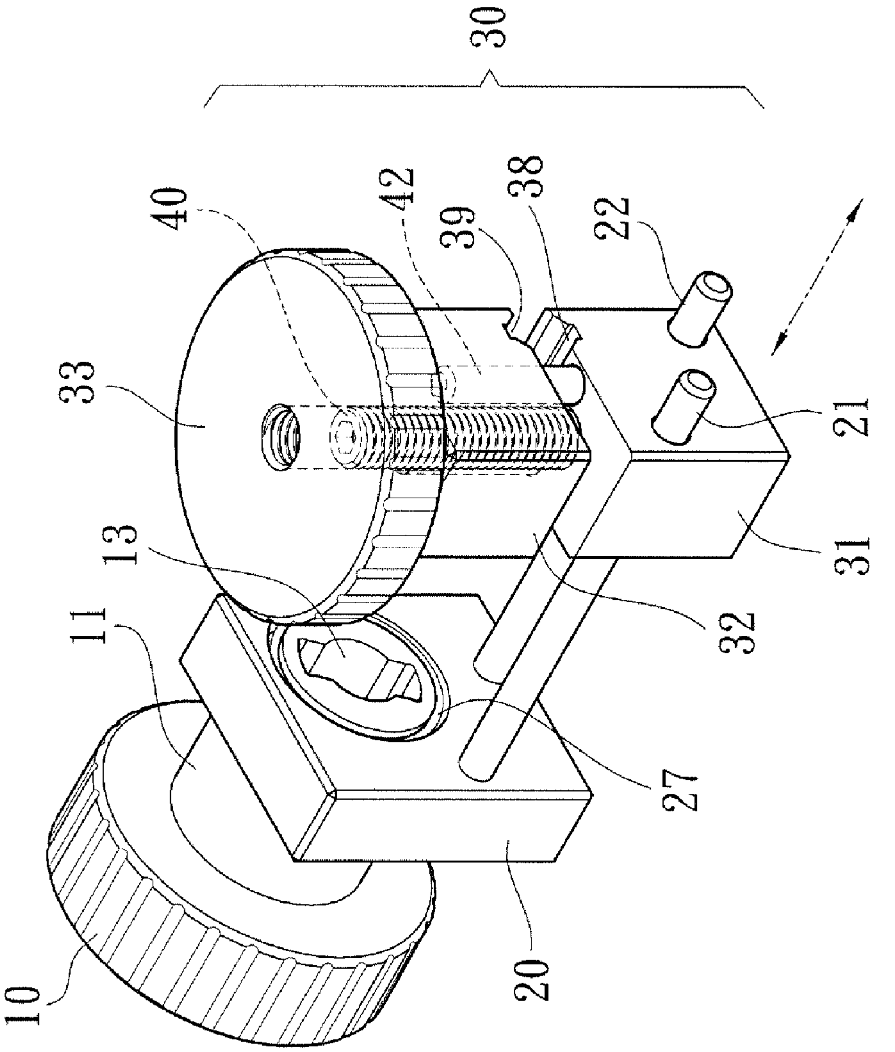
FIG. 2 is a perspective view showing the invention after being assembled.

As shown in FIGS. 1 and 2, a clamping device, for detaching a universal coupling of a remote controlled car shock absorber, according to the present invention, comprises a horizontal roller 10, a holder 20 and a mobile element 30.

The horizontal roller 10 is provided at one side with an extrusion 11 which is formed into a first cylinder and a second cylinder, wherein a step 12 is formed between the first cylinder and the second cylinder; the second cylinder has a diameter less than the first cylinder. The free end of the second cylinder of the extrusion 11 is provided with an engagement socket 13, the surrounding of which has a circle groove 14 for rotation purpose when the extrusion 11 couples with the holder 20.

The holder 20 is provided with slide bars for combination with the mobile element 30. As shown, the slide bars of the holder 20 include a first slide bar 21 and a second slide bar 22. Besides, the holder 20 has a hole 23 which has a step 24. The holder 20 is provided with a first threaded hole 25 and a second threaded hole 26, such that the rear end of the first slide bar 21 can be screwed to the first threaded hole 25, and the rear end of the second slide bar 22 can be screwed to the second threaded hole 26 (as shown in FIG. 2).

Figure 4:
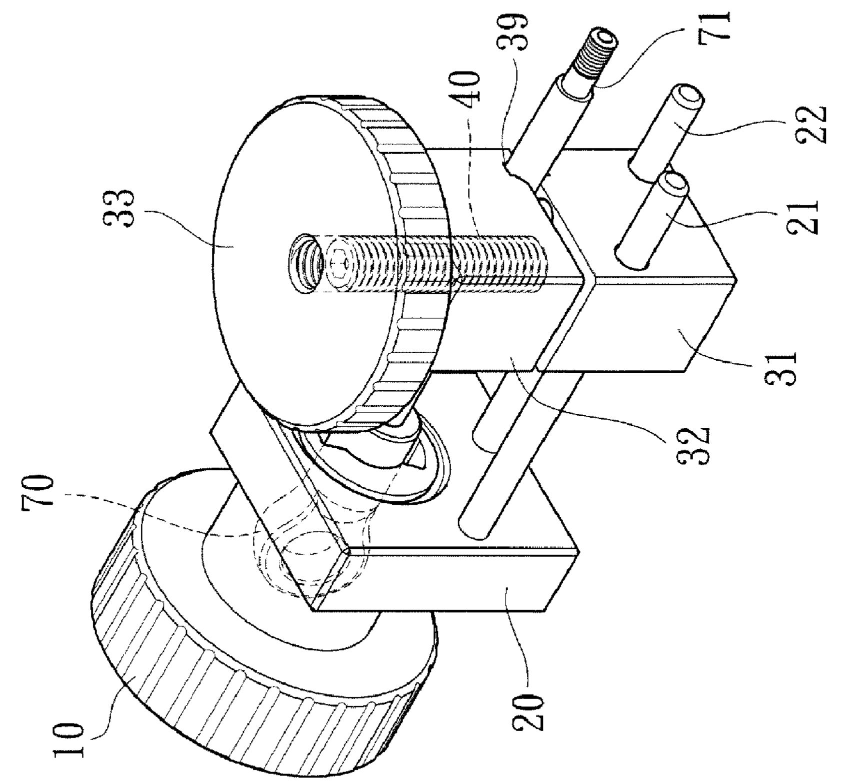
FIG. 4 is a perspective view of the invention showing fastening of the axis of the shock absorber and the universal coupling.
Figure 3:
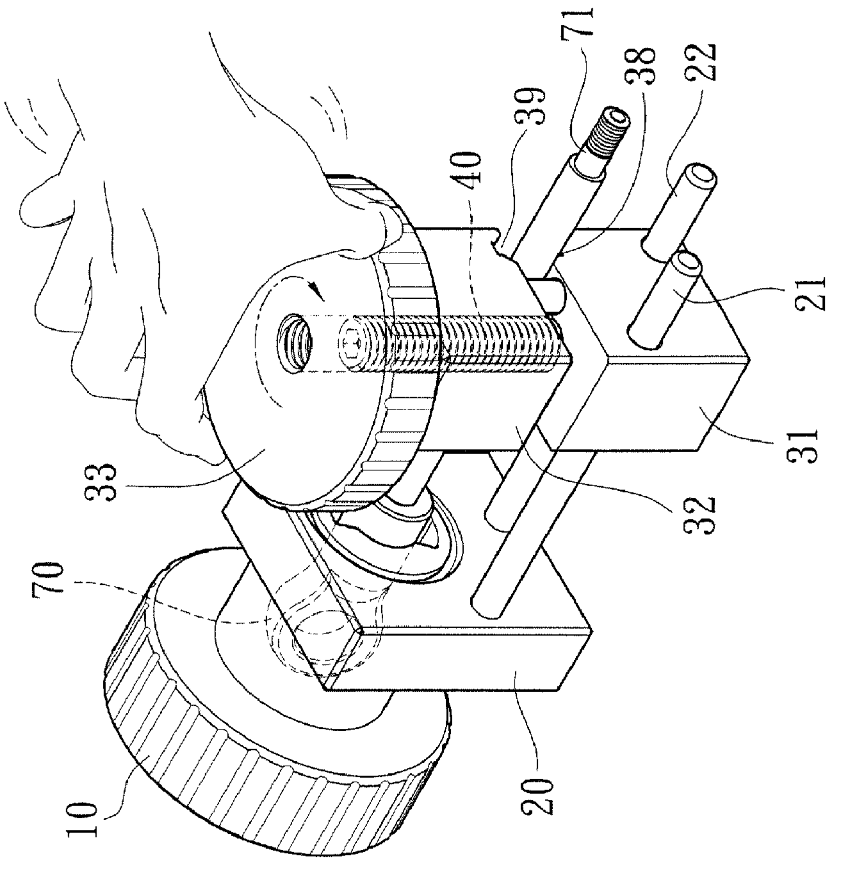
FIG. 3 shows operation of the invention by rotating the elevating roller to hold the axis of the shock absorber.

The mobile element 30 is provided with a lower base 31, an upper base 32 and an elevating roller 33; the lower base 31 has a first slide hole 34 and a second slide hole 35, the positions of which are corresponding to those of the first threaded hole 25 and the second threaded hole 26 on the holder 20. The top of the lower base 31 has a bolt 40, whereas the upper base 32 has a through hole 41, such that the bolt 40 can go through the through hole 41 to screw to the threaded hole 36 of the elevating roller 33. As shown in FIG. 1, the preferred embodiment of the invention may further provide a washer 37 between the upper base 32 and the elevating roller 33, in order to avoid friction with the top surface of the upper base 32 during rotation of the elevating roller 33. In addition, one side of the top surface of the lower base 31 is provided with a lower groove 38, which is co-linearly aligned with the engagement socket 13 and the hole 23 of the holder 20, whereas the corresponding side of the lower bottom surface of the upper base 32 is provided with an upper groove 39, such that the two grooves (38, 39) can correspond to each other. A positioning bar is provided between the lower base 31 and the upper base 32. As shown, the lower base 31 has at least one positioning bar 42, whereas the upper base 32 has at least one corresponding slide hole 43, such that the positioning bar 42 can slide into the slide hole 43, and that the two grooves (38, 39) can hold the axis 71 of the shock absorber (as shown in FIGS. 3 and 4). It is noted that the bolt 40 and the positioning bar 42 extends substantially perpendicular to the lower groove 38; the first slide hole 34 and the second slide hole 35 are defined substantially parallel to the lower groove 38.

Referring to FIGS. 1 and 2, when assembling, the extrusion 11 of the horizontal roller 10 is placed into the hole 23 of the holder 20, and the free end of the extrusion 11 out of the hole 23 is engaged with the holder 20 by way of locking the ring 27 onto the circle grooves 14. In the preferred embodiment, limited to the outer wall of the hole 23, such that the ring 27 can be placed onto the the step 12 can limit the length of the extrusion 11 being inserted through the hole 23 of the holder 20; the ring 27 placed onto the circle groove 14 can lean against the step 24 of the holder 20. Accordingly, the horizontal roller 10 can be rotated without detaching from the holder 20. The first slide bar 21 and the second slide bar 22 of the holder 20 go through the first slide hole 34 and the second slide hole 35 of the lower base 31, respectively, wherein the first slide bar 21 is arranged substantially parallel to the lower groove 38, and the second slide bar 22 is arranged substantially parallel to the first slide bar 21, such that the lower base 31 can horizontally move away from or move forth towards the holder 20 (as shown in FIG. 2). This would help positioning during detachment and assembly of the universal coupling 70 of the shock absorber, as well as help adjustment by screwing.

Figure 6:
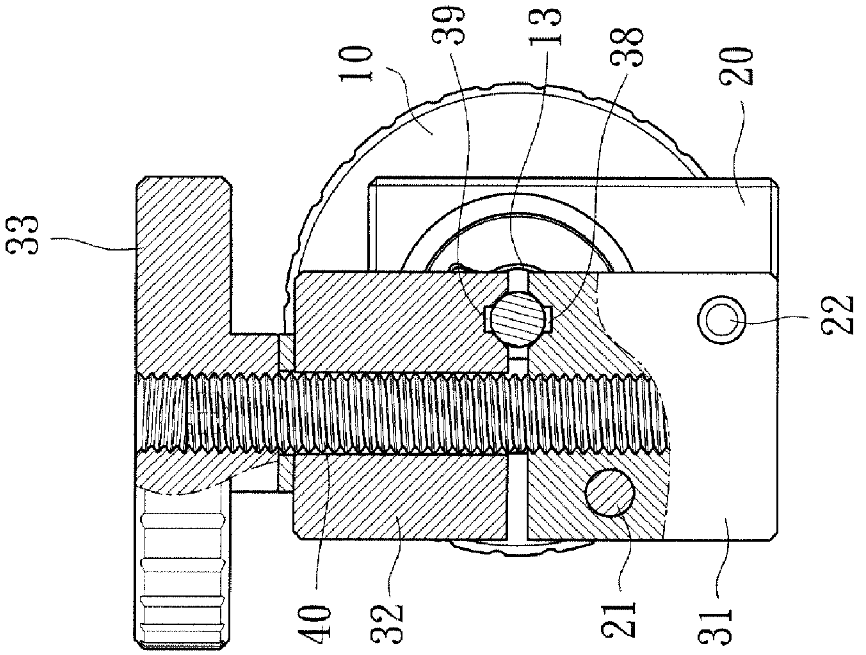
FIG. 6 is a partial cut-away view of FIG. 4.
Figure 5:
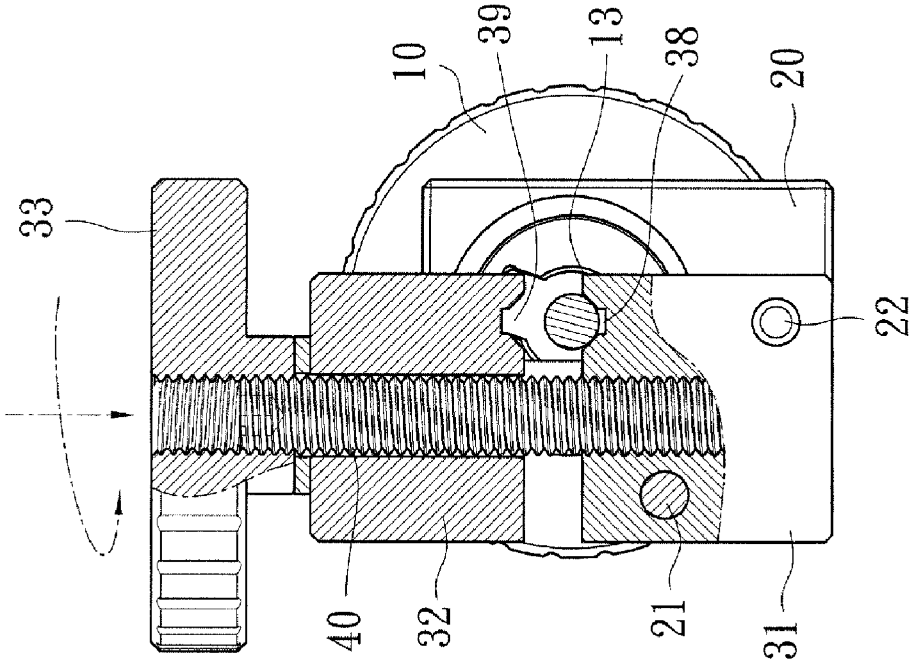
FIG. 5 is a partial cut-away view of FIG. 3.

As shown in FIGS. 3~6, when detaching the universal coupling 70 of the shock absorber from the axis 71, the universal coupling 70 is placed into the engagement socket 13 of the extrusion 11, and the axis 71 connected to the rear end of the universal coupling 70 is placed in the lower groove 38 of the lower base 31 (see FIGS. 3 and 5). The elevating roller 33 is rotated to make the upper base 32 go down till the upper groove 39 of the upper base 32 presses on the axis 71 of the shock absorber, thereby allowing the axis 71 to be fastened by the clamp of the lower groove 38 and upper groove 39 (as shown in FIGS. 4 and 6).

Figure 8:
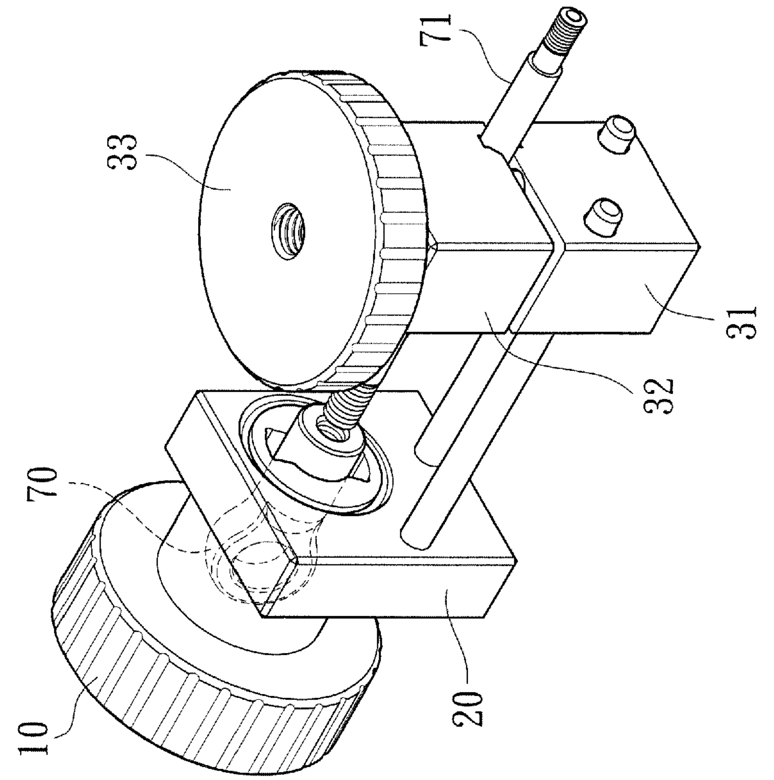
FIG. 8 shows detachment of the axis of the shock absorber from the universal coupling.
Figure 7:
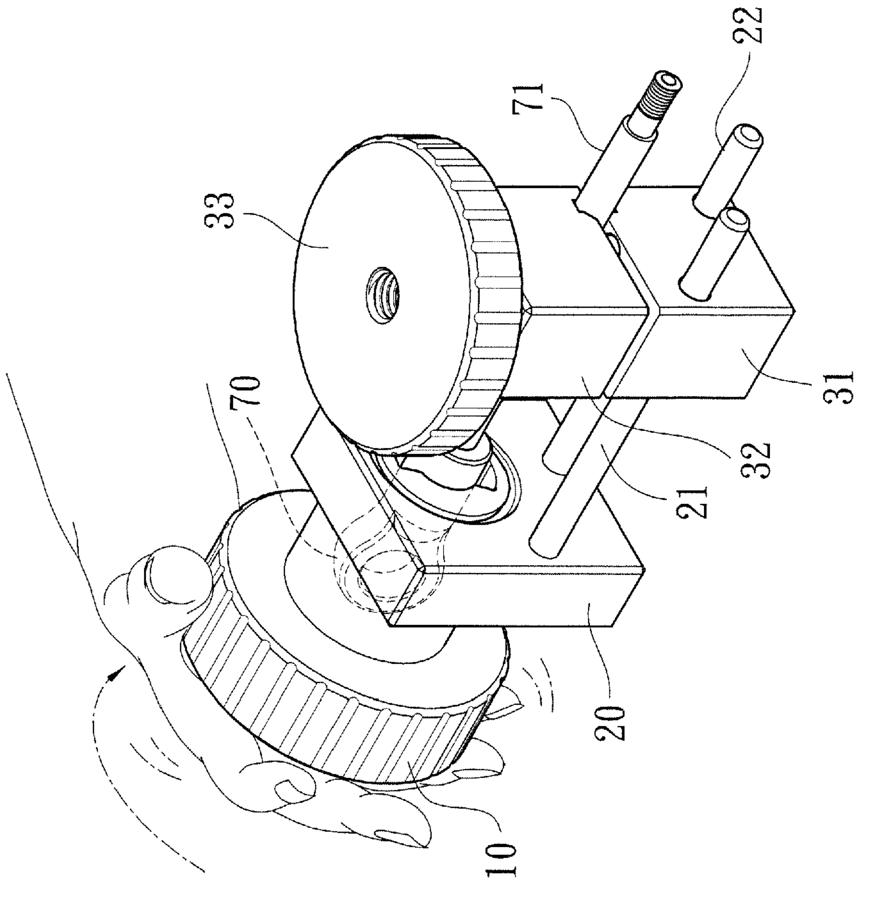
FIG. 7 shows rotating the horizontal roller to detach the axis of the shock absorber from the universal coupling.
Figure 9:
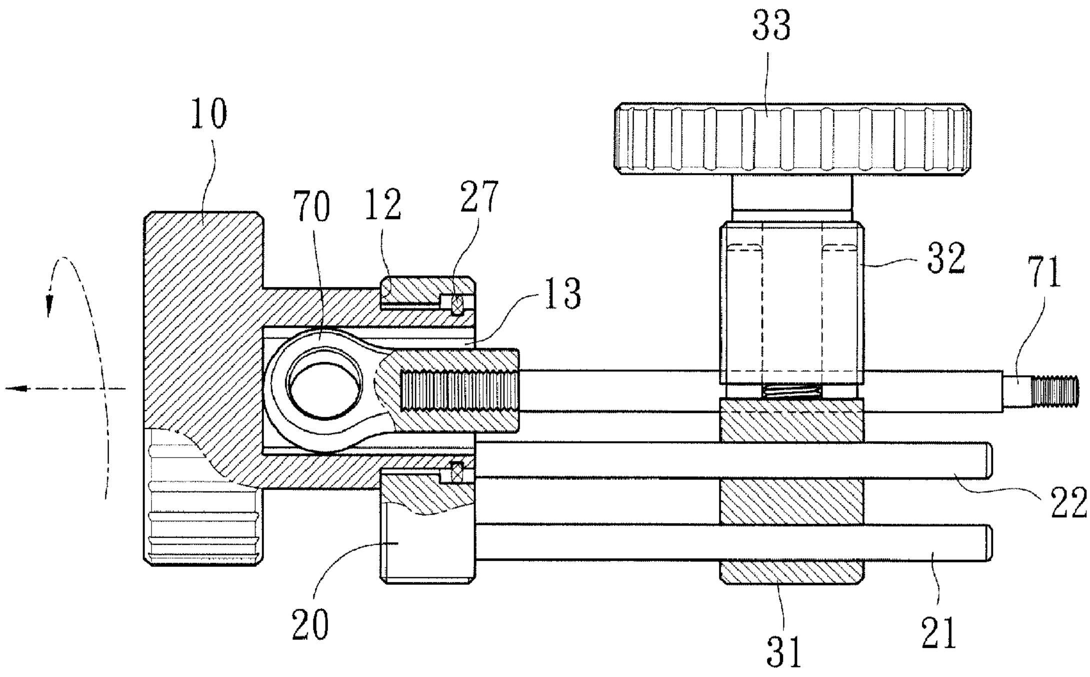
FIG. 9 is a partial cut-away view of FIG. 7.
Figure 10:
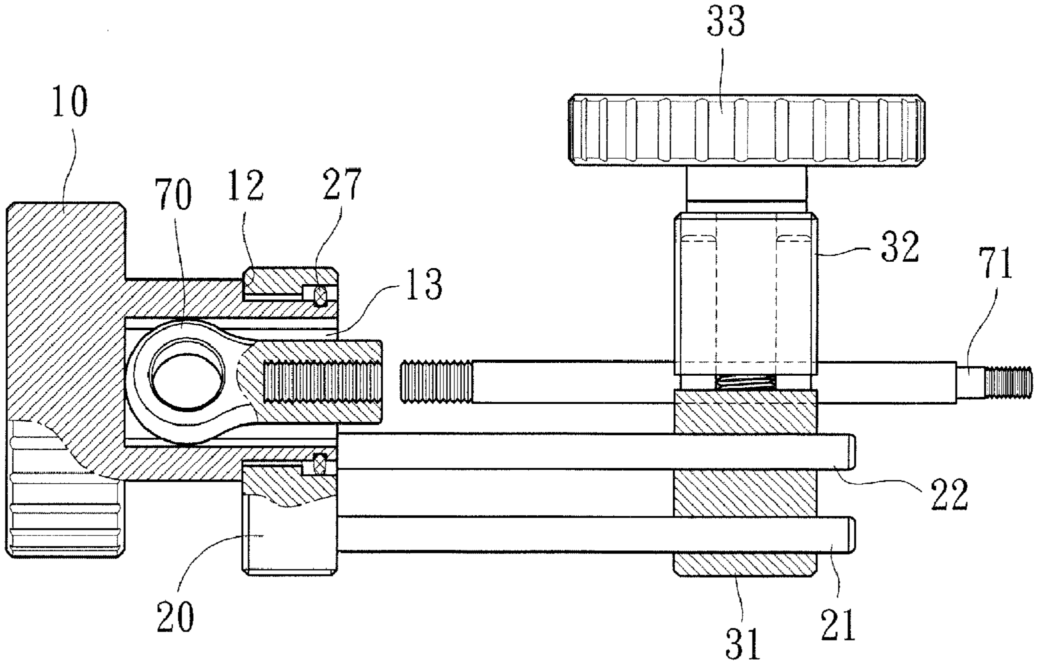
FIG. 10 is a partial cut-away view of FIG. 8.

As shown in FIGS. 7-10, after the universal coupling 70 of the shock absorber and axis 71 are fastened, the horizontal roller 10 is rotated. As the axis 71 of the shock absorber is clamped by the lower groove 38 of the lower base 31 and the upper groove 39 of the upper base 32, when the universal coupling 70 is rotated by the horizontal roller 10 (as shown in FIGS. 7 and 9), the universal coupling 70 would detach from the axis 71 of the shock absorber. Besides, as the horizontal roller 10 is locked by the ring 27 and the step 12, the axis 71 will move rightward due to the swirl direction of its threads (as shown in FIG. 10). Accordingly, while the first slide bar 21 and the second slide bar 22 are placed in the first hole 34 and the second hole 35 of the lower base 31, respectively, such that the mobile element 30 together with the axis 71 can be forced to move away from the holder 20 (as shown in FIGS. 8 and 10), thereby protecting the axis 71 of the shock absorber during the process of detaching the axis 71 from the universal coupling 70, and avoiding impairment of the surface of the axis 71.

Figure 11:
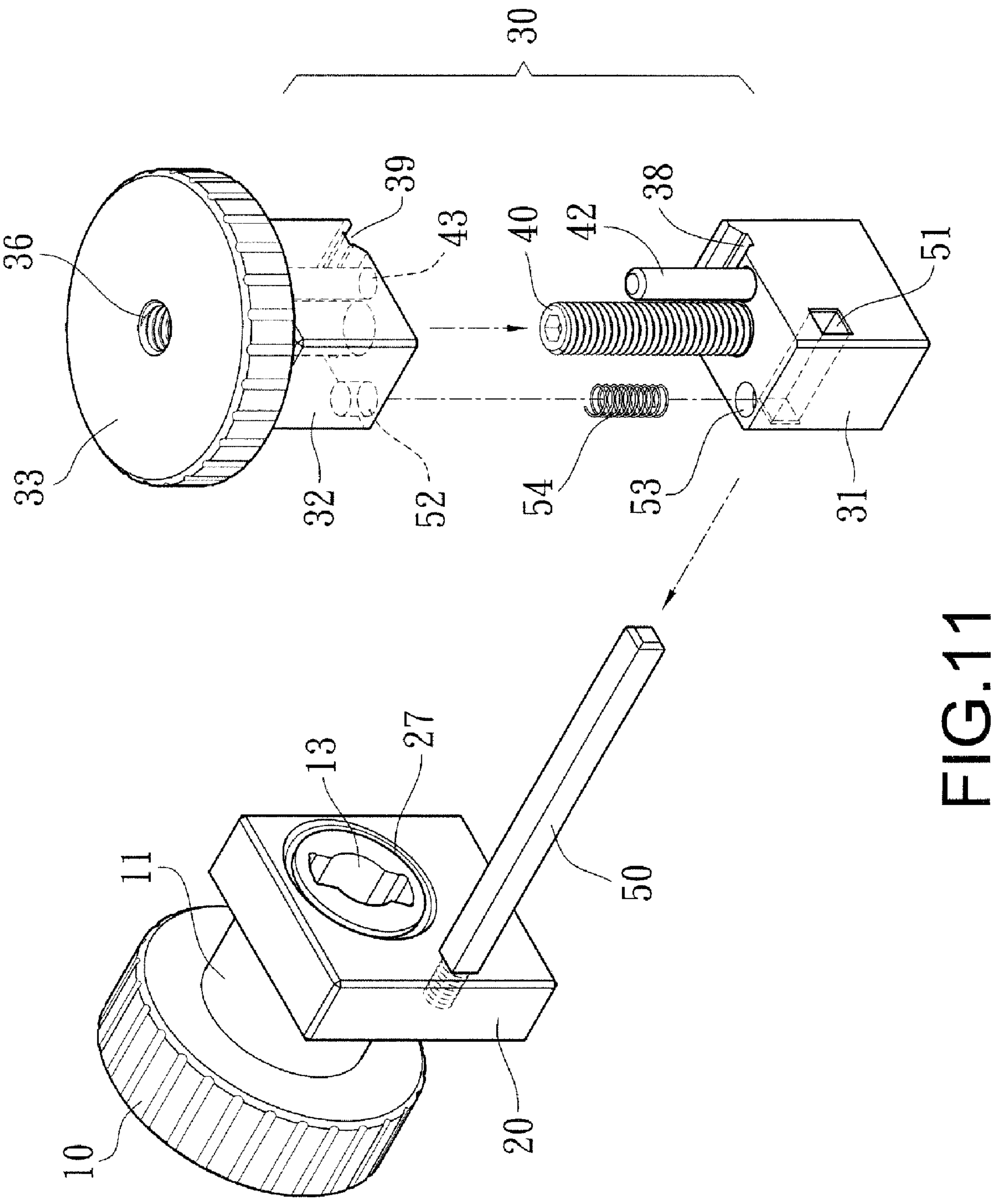
FIG. 11 is an exploded view of another embodiment of the invention.

Referring to FIG. 11, the first slide bar 21 and the second slide bar 22 provided on the holder 20 can alternatively be one single polyhedral bar 50 in replacement of two round slide bars. As shown in FIG. 11, the polyhedral bar is in a design of a tetragonal slide bar, and the corresponding place of the lower base 31 is provided with a polyhedral hole 51, as shown is a tetragonal slide hole. The slide hole 43 of the upper base 32 is correspondingly connected to the positioning bar 42, such that the bolt 40 of the lower base 31 will go through the through hole 41 of the upper base 32 and the washer 37, and subsequently screw to the threaded hole 36 of the elevating roller 33 to accomplish the assembly.

As shown in FIG. 11, another embodiment of the invention, the bottom of the upper base 32 may be further provided with a receiving groove 52, whereas the corresponding position at the lower base 31 may be provided with a receiving groove 53, such that a spring 54 can be placed between the two receiving grooves (52, 53) of the upper base 32 and the lower base 31 for pushing up the upper base 32 at the time when the elevating roller 33 is rotated to lift, and for automatically detaching the lower groove 38 from the upper groove 39. Under the same design concept, the provision of the receiving grooves (52, 53) can be spared, and replaced by a spring of relatively great diameter mounted on the bolt 40, such that the spring may prop up between the lower base 31 and upper base 32 to obtain the same effect.

In addition, in the embodiment shown, the holder 20 is connected to the lower base 31 of the mobile element 30 via slide bars. Alternatively the slide bars (21, 22) or polyhedral bar 50 of the holder 20 can be connected to the upper base 32, which is not shown in the embodiments but can be easily expected. Accordingly, the upper base 32 is provided with a first slide hole, a second slide hole or a polyhedral slide hole 51 to obtain an integrally the same effect.

Concluded above, the clamping device for detaching the universal coupling of a remote controlled car shock absorber according to the invention can allow the user to easily detach, adjust, loosen or fasten the universal coupling.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A clamping device, for detaching a universal coupling of a remote controlled car shock absorber, comprising:

a horizontal roller provided with an extrusion that has an engagement socket at a free end thereof;

a holder defining a hole for pivotally connecting with the extrusion of the horizontal roller; and a mobile element including a lower base, an upper base, and an elevating roller defining a central threaded hole, the lower base being provided with a positioning bar and a bolt at a top surface thereof, and defining a lower groove on the top surface thereof and a first slide hole on a side surface thereof, the lower groove being co-linearly aligned with the engagement socket of the extrusion and the hole of the holder, the first slide hole being defined substantially parallel to the lower groove; the positioning bar and the bolt extending substantially perpendicular to the lower groove, the upper base defining a slide hole and a through hole respectively corresponding to the positioning bar and the bolt of the lower base, the upper base defining an upper groove corresponding to the lower groove of the lower base at a bottom surface thereof, the positioning bar capable of being inserted into the slide hole of the upper base, the bolt capable of being inserted through the through hole of the upper base to be screwed to the central threaded hole of the elevating roller; and a first slide bar being attached to the holder at one end thereof and slidably inserted through the first slide hole of the lower base at the other end thereof, the first slide bar being arranged substantially parallel to the lower groove of the lower base;

whereby a universal coupling can be received in the engagement socket, whereas an axis screwed to the universal coupling can be clamped between the lower groove of the lower base and the upper groove of the upper base, therefore, the horizontal roller can drive the universal coupling to rotate about the hole of the holder whereas the axis is kept stationary, thereby disengaging the universal coupling from the axis, and during the rotation process, the mobile element together with the axis can be forced to move away from the holder along the first slide bar.

2. The clamping device of claim 1, wherein the extrusion of the horizontal roller is provided with a step and defines a circle groove at the surrounding of the engagement socket, the extrusion being inserted through the hole of the holder to have the circle groove fastened with a ring, so that the horizontal roller can avoid separating from the holder while rotating the horizontal roller.

3. The clamping device of claim 2, wherein a washer is provided between the elevating roller and the upper base.

4. The clamping device of claim 3, wherein the first slide bar attached to the holder is a polyhedral bar; the first slide hole defined on the lower base of the mobile element is a polyhedral hole.

5. The clamping device of claim 3, wherein the lower base of the mobile element further defines a second slide hole, substantially parallel to the lower groove, on the side surface thereof, and which further comprises a second slide bar being attached to the holder at one end thereof and slidably inserted through the second slide hole of the lower base at the other end thereof, the second slide bar being arranged substantially parallel to the first slide bar.

6. The clamping device of claim 4 or claim 5, wherein a spring is provided between the lower base and the upper base.

* * * * *